(12) United States Patent
Dharanikota

(10) Patent No.: US 8,787,363 B2
(45) Date of Patent: Jul. 22, 2014

(54) FAULT ISOLATION CONSTRUCTS FOR POTS EMULATION SERVICE ON AN FTTX PLATFORM

(75) Inventor: Sudheer Dharanikota, Cary, NC (US)

(73) Assignee: Alcatel Lucent, Boulogne Billancourt (FR)

( * ) Notice: Subject to any disclaimer, the term of this patent is extended or adjusted under 35 U.S.C. 154(b) by 1735 days.

(21) Appl. No.: 11/217,953

(22) Filed: Sep. 1, 2005

(65) Prior Publication Data
US 2006/0062210 A1  Mar. 23, 2006

Related U.S. Application Data

(60) Provisional application No. 60/611,986, filed on Sep. 22, 2004.

(51) Int. Cl.
*H04L 12/66* (2006.01)
*H04M 3/08* (2006.01)
*H04M 3/22* (2006.01)

(52) U.S. Cl.
USPC ...... 370/356; 370/352; 379/22.03; 379/22.04

(58) Field of Classification Search
USPC ............. 370/250, 352–356; 379/22.03–22.04
See application file for complete search history.

(56) References Cited

U.S. PATENT DOCUMENTS

| 5,940,472 | A  | * | 8/1999 | Newman et al. | ........... 379/10.02 |
| 7,349,344 | B1 | * | 3/2008 | Hogg | ............................. 370/241 |
| 2002/0120758 | A1 | * | 8/2002 | Chang | ........................... 709/230 |
| 2004/0003070 | A1 | * | 1/2004 | Fernald et al. | ................ 709/223 |
| 2004/0062204 | A1 | * | 4/2004 | Bearden et al. | ................ 370/250 |
| 2004/0121775 | A1 | * | 6/2004 | Ropolyi et al. | ............... 455/445 |
| 2008/0002669 | A1 | * | 1/2008 | O'Brien et al. | ............... 370/352 |

* cited by examiner

*Primary Examiner* — Asad Nawaz
*Assistant Examiner* — Nicholas Jensen
(74) *Attorney, Agent, or Firm* — RGIP LLC

(57) ABSTRACT

Fiber to the user ("FTTU'), fiber to the curb ("FTTC"), fiber to the node ("FTTN"), and fiber to the premise ("FTTP") platforms (referred to herein as "FTTx"), require plain old telephony service ("POTS") emulation using voice over IP ("VoIP") signaling and bearer channels. Such a POTS emulation service requires emulation of existing fault isolation mechanisms in POTS and also must be extended to the topologies in the VoIP environment. The present invention is adapted to provide POTS emulation using existing fault isolation mechanisms in POTS and also provides POTS emulation for topologies in VoIP environments in the scope of FTTx.

18 Claims, 1 Drawing Sheet

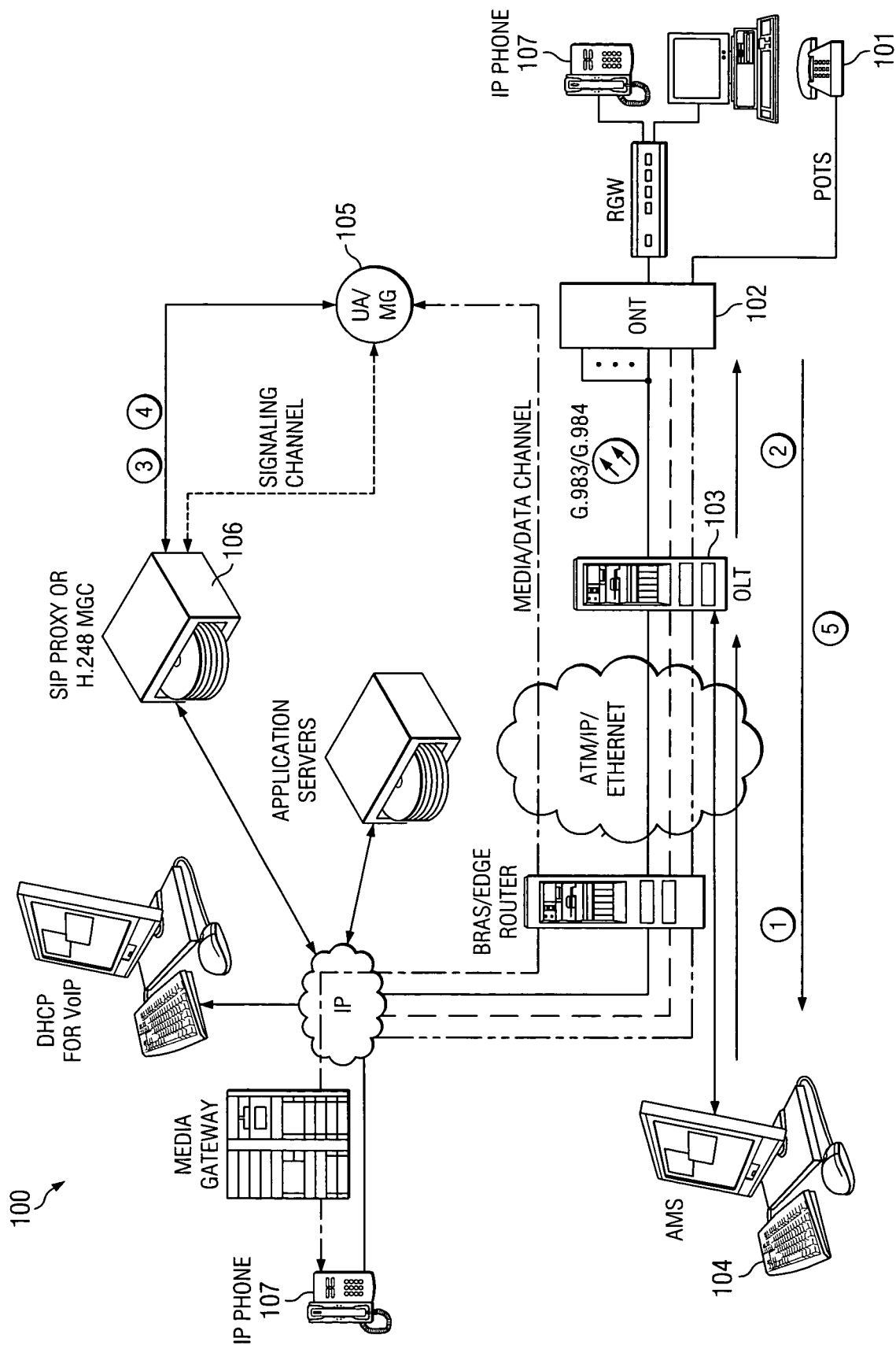

FAULT ISOLATION CONSTRUCTS FOR POTS EMULATION SERVICE ON AN FTTX PLATFORM

CROSS REFERENCE TO RELATED APPLICATIONS

This application is related to and claims the benefit of U.S. Provisional Application No. 60/611,986 filed on Sep. 22, 2004, entitled FAULT ISOLATION CONSTRUCTS FOR SIP-BASED USER AGENT ON AN FTTU PLATFORM, under 35 U.S.C. Section 119(e), the entire contents of which are enclosed by reference as if presented in their entirety herein.

TECHNICAL FIELD

The present invention relates to POTS emulation using Voice over IP ("VoIP") signaling and bearer channels.

BACKGROUND OF THE INVENTION

Fiber to the user ("FTTU'), fiber to the curb ("FTTC"), fiber to the node ("FTTN"), and fiber to the premise ("FTTP") platforms (referred to herein as "FTTx"), require plain old telephony service ("POTS") emulation using VoIP signaling and bearer channels. Such a POTS emulation service requires emulation of existing fault isolation mechanisms in POTS and also must be extended to the topologies in the VoIP environment. Some similar tests are available in the circuit switch based POTS. However, these conventional solutions do not address the POTS emulation services over data networks.

As used herein, "MEGACO" refers to the H.248 gateway control protocol, "MGCP" refers to the media gateway control protocol, and "SIP" refers to the session initiation protocol.

VoIP implementations enable users to carry voice traffic (for example, telephone calls and faxes) over an IP network. A VoIP system consists of a number of components including a gateway/media gateway, a gatekeeper, a call agent, a media gateway controller, a signaling gateway, application gateways, session border controllers, a call manager, and other components.

For example, a media gateway converts media provided in one type of network to the format required for another type of network. A gateway could terminate bearer channels from a switched circuit network and media streams from a packet network. This gateway may be capable of processing audio, video and T.120 alone or in any combination, and is capable of full duplex media translations.

VoIP technology utilizes a digital signal processor ("DSP") to segment the voice signal into frames and store them in voice packets. These voice packets are transported using IP in compliance with one of the specifications for transmitting multimedia (voice, video, fax and data) across a data network using signaling protocols such as H.323, MGCP, MEGACO or SIP.

As VoIP is a delay and jitter sensitive application, a well-engineered end-to-end network is necessary to use VoIP successfully.

SUMMARY OF THE INVENTION

The present invention is adapted to provide POTS emulation service using existing fault isolation mechanisms in POTS and also provides POTS emulation for topologies in the VoIP environment in the scope of FTTx. In one embodiment, a method for emulating Plain Old Telephony Service (POTS) using Voice over Internet Protocol (VoIP) signaling channels and bearer channels comprises emulating existing fault isolation mechanisms in POTS, and extending fault isolation mechanisms to topologies in a VoIP environment.

In another embodiment, a computer readable medium comprises instructions for: tracing a call end-to-end in a Voice over Internet Protocol (VoIP) environment on an Optical Network Terminal (ONT) VoIP stack, and performing Session Initiation Protocol (SIP) signaling and media continuity testing on at least a portion of the call.

In a further embodiment, a system adapted to emulate Plain Old Telephony Service (POTS) comprises a first module adapted to receive a request for signaling and media continuity testing, the request including a destination phone number, a second module adapted to receive the request via a control channel on the first module, and a third module, wherein the second module is adapted to invoke a test case that executes a call through the third module to the destination phone number.

BRIEF DESCRIPTION OF THE DRAWINGS

FIG. 1 illustrates a VoIP testing methodology according to a preferred embodiment of the present invention.

DETAILED DESCRIPTION OF PREFERRED EMBODIMENTS

The present invention is distinguishable from conventional methods, such as POTS over circuit switched services, as the signaling and bearer channel are intertwined as opposed to a VoIP case in which these channels are separate. Such a fundamental difference in providing the POTS services requires novel techniques to address the faults caused in the segregated signaling and data topology.

Providing POTS emulation service on the FTTx platform requires isolating faults in the FTTx node to the consumer network electronics, isolating the signaling, irrespective of the signaling protocol such as SIP, MEGACO or MGCP, path level faults between the FTTx node and the soft switch, and isolating the bearer path level faults between the FTTx node and the media gateway.

The faults covered include:
Physical connectivity issues and faults.
POTS—No connectivity, transmission issues, voice processing issues etc.
Service related issues and faults.
Control and management plane components—IP address allocation and reachability, Signaling server (application server or MGC) reachability and configuration.
Data plane components—delay, jitter, and excess packet loss.
QoS and CoS components—Poor voice quality related issues: These issues are related to the configuration of the CoS parameters on the FTTP platform. Such issues are addressed by the common control and management plane configurations.

The fault isolation mechanisms described in the current invention include:
FTTx node to consumer (or customer) network electronics test, also known as Metallic Loop Testing ("MLT"): The conventional solutions used in POTS are sufficient here.
Emulation of Pull Break ("P/B") test: A typical P/B test is used to isolate the faults between the customer and the Class 5 switch in the PSTN network. This test in POTS emulation service over data networks is broken into the MLT test to the customer and P/B emulation service to the signaling server.

In addition to the above services, the present invention provides several other tests that are relevant to the POTS emulation. These include:

Reachability tests which include telephone number reachability and signaling server reachability. Telephone number reachability is a test conducted to verify the reachability to the milliwatt server or to a given telephone number. Signaling server reachability tests include reachability to the signaling server, SIP Proxy, when SIP is used as a signaling protocol, or to the MGC when MEGACO is used as a signaling protocol.

Traceability tests include signaling server traceability and call traceability. Signaling server traceabilty is a test conducted when it is determined that the signaling server is not reachable and the operator would like to trace the connectivity to the server.

Call traceability is a test that traces an end-to-end call using a bearer path tracing function. This test is useful when the customer determines the signaling path is proper but the bearer path is not operational.

Now, referring to FIG. 1, an FTTx scenario is presented illustrating different fault isolation techniques of the present invention. As an example, an FTTP platform or system 100 is depicted. It is important to note that other FTTx platforms may also be utilized with their corresponding components without departing from the scope of the present invention. As seen therein, an FTTP platform 100 is provided wherein a POTS customer (not shown), utilizing a telephone 101 is connected to a remote Optical Network Termination ("ONT") node 102 using an RJ11 port. The ONT node 102 is managed though standards based control communication mechanisms that extend between an Optical Line Termination ("OLT") node or first module 103, central office equipment, and the ONT or second module 102. In this example, the fault isolation test cases from a management system (AMS) 104 are triggered.

As an example, it is assumed that a customer opens a fault ticket indicating their phone is not working. The following tests are conducted (possibly, but not necessarily, in the same order) to isolate the fault:

1. Loss of communication with the voice gateway: The present invention provides mechanisms (in the loop emulation utilizing MEGACO only) to automatically identify failed connectivity between a voice gateway and a media gateway (for example, the ONT 102 when utilizing the FTTP platform) using the following procedures:
   a. The FTTx platform of the present invention supports an Inactivity Timer package (H.248.14) that dictates the accepted silence interval in the control plane communication between the ONT and voice gateway. If there are packets in that interval send an audit message (see below), and
   b. The FTTx platform of the present invention supports H.248 audit mechanisms to identify potential loss of communication between ONT and voice gateway.

2. Metallic Loop Testing (MLT): This is the basic test triggered by the operator through the AMS 104 to the ONT 102 to run the standard MLT test between the ONT 102 and the POTS 101 phone on the RJ11 port. This test will identify any issues with the ONT 102 and the POTS 101 connectivity. The results are communicated back to the operator. The operator may then run the following tests (or may run the following tests without performing the MLT):

3. Signaling and media continuity testing (similar to pull/break testing): The goal of the test is to provide an end-to-end signaling and media testing capability for the SIP User Agent (UA) 105 or MEGACO Media Gateway (MG) 105 functionality on the ONT 102 before turning it on for the service or during trouble shooting. The SIP UA 105 is a logical entity in a SIP network that initiates or responds to SIP requests. Almost every element of a SIP network exhibits a UA behavior either as a UA-Client by initiating SIP requests or as a UA-Server responding to requests or both. The UA thus forms the basic building block for all elements in a SIP network. The following are the steps performed in this test:
   a. Step 1: A command is sent to a specific ONT for signaling and media continuity testing with a destination phone number. Here the phone number could be that of the operator, a PSTN number, or the number of a milliwatt tone generator that can send a 1004 Hz signal.
   b. Step 2: This command is communicated through the control channel on the OLT 103 to the requested ONT.
   c. Step 3: ONT invokes a test case that executes a call through the SIP proxy 106, MEGACO MGC 106, or third module to the number provided.
   d. Step 4: Completion of the call with the stable RTP session or milliwatt data (when the milliwatt tone generator number is dialed) will provide the signaling and data continuity.
   e. Step 5: Results are sent to the requesting entity.
   Note that an issue with this test will prompt the provider to conduct the following tests to isolate the fault either in the signaling or in the data path.

4. Reachability testing: In all these following test cases, the same communication mechanism as described above is utilized.
   a. Configuration retrieval: The first issue an operator may want to test is if the configuration of the ONT contains the proper information. For this purpose, test cases are provided to retrieve salient information from the ONT.
   b. Proxy reachability: This is a basic test that assures the operator that a proxy configured on the ONT is reachable by the ONT. Here we allow PING messages for the duration of the testing to reach the SIP proxy (or MEGACO MGC).

If the operator does see an issue with any of the tests he will conduct the following traceability test to isolate the exact location in the signaling or data path.

5. Traceability testing:
   a. Proxy traceability: A SIP proxy, or MEGACO MGC, can be multiple IP hops away from the ONT. In this case, it may be useful for the operator to trace the path to the proxy to isolate the reachability issues. This is achieved through the TRACEROUTE functionality on the ONT.
   b. Call trace: Tracing a call end-to-end is a feature that is more suitable to the SIP proxy.

Table 1 sets forth a summary of ONT Management Communication Interface (OMCI) testing related requirements (relevant for an FTTU platform) and table 2 provides an overview of SIP/IP stack testing related requirements. Note that even though a case study of OMCI in the following table is described, the same procedures are applicable to the other FTTx technologies through other means such as SNMP messaging instead of OMCI.

TABLE 1

OMCI testing related requirements on an FTTU platform.

| Reference number | Title |
| --- | --- |
| VoIP.FL.OMCI.T | VoIP testing requirements |
| VoIP.FL.OMCI.T.0 | OMCI messages to conduct the following test cases per POTS line should be supported. |
| VoIP.FL.OMCI.T.1 | SIP signaling and media continuity testing |
| VoIP.FL.OMCI.T.1.1 | An OMCI command is sent to a specific ONT for signaling and media continuity testing with a destination phone number. Here the phone number could be that of the operator, a PSTN number, or the number of a milliwatt tone generator that can send a 1004 Hz signal. |
| VoIP.FL.OMCI.T.1.2 | Send an OMCI message as a response to the tests conducted above. |
| VoIP.FL.OMCI.T.2 | Reachability testing |
| VoIP.FL.OMCI.T.2.1 | The first issue an operator may want to test is if the configuration of the ONT contains the proper information. For this sake, we provide test cases to retrieve salient information from the ONT. An OMCI message is sent to retrieve the configuration. Here we need to define what should be part of the configuration retrieval. An OMCI message carrying the response is sent back to the operator. |
| VoIP.FL.OMCI.T.2.2 | This is a basic test that assures the operator that a proxy configured on the ONT is reachable by the ONT. Here we allow PING messages for the duration of the testing to reach the SIP proxy. An OMCI message is sent to ping the proxy. The results are sent back to the operator in an OMCI message. A typical PING program is suitable for this operation. |
| VoIP.FL.OMCI.T.2.3 | A SIP proxy can be multiple IP hops away from the ONT. In this case, it may be useful for the operator to trace the path to the proxy to isolate the reachability issues. A "traceroute" program is suitable for this operation. |
| VoIP.FL.OMCI.T.3 | MLT testing |
| VoIP.FL.OMCI.T.3.1 | Once the continuity and reachability tests are performed, the connectivity between the SIP stack and the POTS phone through the DSP need to be verified. These tests are common to the MLT tests performed in the PSTN architecture. |
| VoIP.FL.OMCI.T.4 | Call trace |

TABLE 2

SIP/IP stack testing related requirements

| Reference number | Title |
| --- | --- |
| VoIP.FL.SIP.T | VoIP SIP testing requirements |
| VoIP.FL.SIP.T.1 | SIP signaling and media continuity testing |
| VoIP.FL.SIP.T.1.1 | ONT should be capable of running the test as mentioned above in the prose to make the test and send the response back to the OLT through OMCI response. |
| VoIP.FL.SIP.T.1.2 | This test should be performed per RJ11. |
| VoIP.FL.SIP.T.2 | Reachability testing |
| VoIP.FL.SIP.T.2.1 | A set of ping commands is generated to check the reachability to the SIP proxy. The results are packaged into the response and sent back to the operator. |
| VoIP.FL.SIP.T.2.2 | A trace command can be generated to check the reachability to an IP address. |

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system 100 can be performed by one or more of the modules or components described herein or in a distributed architecture. For example, all or part of the functionality performed by the ONT 102, the OLT 103, the AMS 104, the UA/MG 105, the MGC 106, the IP Phone 107, etc., may be performed by one or more of these modules. Further, numerous FTTx platforms or systems may be utilized with their corresponding components without departing from the scope of the present invention. Also, the functionality described herein may be performed at various times and in relation to various events, internal or external to the modules or components. Further, the information sent between various modules can be sent between the modules via at least one of: a data network, the Internet, a voice network, an Internet Protocol network, a wireless source, a wired source and/or via plurality of protocols. Still further, the modules described herein may be any type of device able to receive and send a message. Also, the messages sent or received by any of the modules may be sent or received directly and/or via one or more of other modules or nodes (not shown).

What is claimed is:

1. A method for emulating Plain Old Telephony Service (POTS) using Voice over Internet Protocol (VoIP) signaling channels and bearer channels, comprising:
   emulating fault isolation mechanisms in POTS;
   emulating a Pull Break (P/B) test; and
   extending fault isolation mechanisms to topologies in a VoIP environment which comprises:
      receiving a signaling and media continuity testing command including a destination telephone number from a control channel of an optical line termination (OLT) responsive to a user phone losing communication service;
      transmitting the signaling and media continuity testing command to a specific optical network termination (ONT) device being tested to determine the ONT's session initiation protocol (SIP) communication capability;
      transmitting a message to a session initiation protocol (SIP) proxy to confirm the SIP proxy is reachable via the ONT;
      tracing a path to the SIP proxy via a tracing command sent to the SIP proxy to isolate the reachability of the SIP proxy;
      executing a test call via the ONT by dialing the destination telephone number through the SIP proxy;
      completing the call; and
      transmitting the results of the test call to a requesting entity.

2. The method of claim 1, comprising providing at least one reachability test.

3. The method of claim 2, wherein the reachability test is a telephone number reachability test.

4. The method of claim 2, wherein the reachability test is a signaling server reachability test.

5. The method of claim 4, wherein the signaling server is a Session Initiation Protocol (SIP) Proxy server, when SIP is used as a signaling protocol, or a Media Gateway Controller (MGC) when a Media Gateway Control Protocol (MEGACO) is used as a signaling protocol.

6. The method of claim 1, wherein the destination phone number is one from a group consisting of: an operator, a Public Switch Telephone Number (PSTN) number, or a number of a milliwatt tone generator.

7. The method of claim 6, comprising providing the signaling and media continuity testing when the call is completed with a stable Real-time Transport Protocol (RTP) session or with milliwatt data when a milliwatt tone generator number is dialed.

8. The method of claim 7, comprising testing reliability.

9. The method of claim 8, wherein the reliability testing further comprises retrieving a configuration of the ONT.

10. The method of claim 1, further comprising testing reliability of a proxy configured on the ONT.

11. The method of claim 10, further comprising allowing PING messages for a duration of the testing to reach the SIP Proxy server or the MEGACO MGC.

12. The method of claim 1, comprising isolating an exact location of a fault in a signaling or media path using a traceability test.

13. The method of claim 12, wherein the traceability test is a proxy traceability test and wherein the proxy traceability test uses a TRACEROUTE functionality on the ONT.

14. A non-transitory computer readable storage medium comprising instructions that when executed by a processor, cause the processor to perform:
  tracing a call end-to-end in a Voice over Internet Protocol (VoIP) environment on an Optical Network Terminal (ONT) VoIP stack; and
    performing Session Initiation Protocol (SIP) signaling, fault isolation testing and media continuity testing on at least a portion of the call; which comprises:
    emulating a Pull Break (P/B) test;
    receiving a signaling and media continuity testing command including a destination telephone number from a control channel of an optical line termination (OLT) responsive to a user phone losing communication service;
    transmitting the signaling and media continuity testing command to a specific optical network termination (ONT) device being tested to determine the ONT's session initiation protocol (SIP) communication capability;
    transmitting a message to a session initiation protocol (SIP) proxy to confirm the SIP proxy is reachable via the ONT;
    tracing a path to the SIP proxy via a tracing command sent to the SIP proxy to isolate the reachability of the SIP proxy;
    executing a test call by dialing the destination telephone number through the SIP proxy via the ONT;
    completing the call; and
    transmitting the results of the test call to a requesting entity.

15. The non-transitory computer readable storage medium of claim 14, wherein the processor is further configured to perform: sending a command to an Optical Network Terminal (ONT) for signaling and media continuity testing with the destination phone number, said phone number being one from a group consisting of: an operator phone number, a Public Switch Telephone Number (PSTN) phone number, or a phone number of a milliwatt tone generator.

16. The non-transitory computer readable storage medium of claim 15, wherein the processor is further configured to perform: encoding the command on an Optical Line Terminal (OLT) to an Optical Network Termination (ONT), the ONT invoking a test case that executes the call through the SIP proxy to the destination phone number.

17. The non-transitory computer readable storage medium of claim 16, wherein the processor is further configured to perform: completing the call with a Real-time Transport Protocol (RTP) session or milliwatt data when the phone number of the milliwatt tone generator is dialed so as to confirm signaling and data continuity.

18. A system configured to emulate Plain Old Telephony Service (POTS), comprising:
  a session initiation protocol (SIP) proxy;
  an optical line termination (OLT); and
  an optical network termination (ONT) configured to
  emulate a Pull Break (P/B) test;
  receive a request for signaling and media continuity testing, the request including a destination phone number, the request received from a control channel on the optical line termination (OLT), responsive to a user phone losing communication service,
  transmit the signaling and media continuity testing command to a specific optical network termination (ONT) device being tested to determine the ONT's session initiation protocol (SIP) communication capability,
  transmit a message to the SIP proxy to confirm the SIP proxy is reachable,
  trace a path to the SIP proxy via a tracing command sent to the SIP proxy to isolate the reachability of the SIP proxy, and wherein
  the session initiation protocol (SIP) proxy is configured to invoke a test case that executes a call by dialing the telephone number through the SIP proxy to the destination phone number, and
  complete the call and transmit the results of the test call to a requesting entity.

* * * * *